(12) United States Patent
Daehn

(10) Patent No.: US 7,000,300 B2
(45) Date of Patent: *Feb. 21, 2006

(54) HIGH VELOCITY FORMING OF LOCAL FEATURES USING A PROJECTILE

(75) Inventor: Glenn S. Daehn, Columbus, OH (US)

(73) Assignee: The Ohio State University, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/926,826

(22) Filed: Aug. 26, 2004

(65) Prior Publication Data

US 2005/0022578 A1   Feb. 3, 2005

Related U.S. Application Data

(63) Continuation of application No. 09/965,993, filed on Sep. 28, 2001, now Pat. No. 6,807,717.

(51) Int. Cl.
*B23P 19/04* (2006.01)
(52) U.S. Cl. .................... 29/254; 29/283.5; 29/798; 29/932.2; 29/525.06; 29/283
(58) Field of Classification Search ............... 29/283.5, 29/283, 254, 243.56, 932.2, 525.06, 798
See application file for complete search history.

(56) References Cited

U.S. PATENT DOCUMENTS

| | | | |
|---|---|---|---|
| 2,140,214 A | | 12/1938 | Temple |
| 3,336,551 A | * | 8/1967 | Stead ............................ 269/8 |
| 3,640,110 A | | 2/1972 | Inoue |
| 4,492,104 A | | 1/1985 | Weaver et al. |
| 4,879,890 A | | 11/1989 | Hardwick |
| 5,730,016 A | | 3/1998 | Zittel |
| 5,884,386 A | * | 3/1999 | Blacket et al. ................ 29/798 |

FOREIGN PATENT DOCUMENTS

JP        401157725 A    6/1989

OTHER PUBLICATIONS

Kolle, Jack, The Hyper-Pressure Pulse Bonding of Aluminum, JOM, vol. 50, No. 8 (Aug., 1998), pp. 29-31.
Web pages from High Energy Metals, Inc., 2 pp., dated Sep. 11, 2001.
Web pages from Blacks Equipment, Direct vs. Inertia, Understanding the Basic Differences Between Direct Drive Friction Welding and Inertia Friction Welding, dated Sep. 11, 2001, 6 pp.

(Continued)

*Primary Examiner*—Robert C. Watson
(74) *Attorney, Agent, or Firm*—Standley Law Group LLP

(57) ABSTRACT

A system and method for accomplishing localized feature forming in a sheet of material and/or the localized joining of multiple sheets of material. The system and method may also be used to attach a secondary component to a sheet of material. The system and method of the present invention employs a die having a shaped cavity for receiving a portion of the sheet material. A projectile is propelled from a projectile firing device to impact the sheet or sheets of material in the area overlying the subjacent die cavity. The projectile forces a portion of the sheet material into the die cavity, imparting a shape thereto. The kinetic energy transferred from the projectile to the sheet material may be used to form a metallurgical bond between multiple sheets of material. The metallurgical bond can be used alone to join the sheets, or may be used in conjunction with an interlocking shape to provide extra strength.

20 Claims, 10 Drawing Sheets

OTHER PUBLICATIONS

Web pages from Blacks Equipment, The Basics, Friction Welding Process in a Nutshell, dated Sep. 11, 2001, 2 pp.

Web pages from Blacks Equipment, Assisting the World with Manufacturing Solutions!, Continuous Drive Friction Welding, dated Sep. 11, 2001, 7 pp.

* cited by examiner

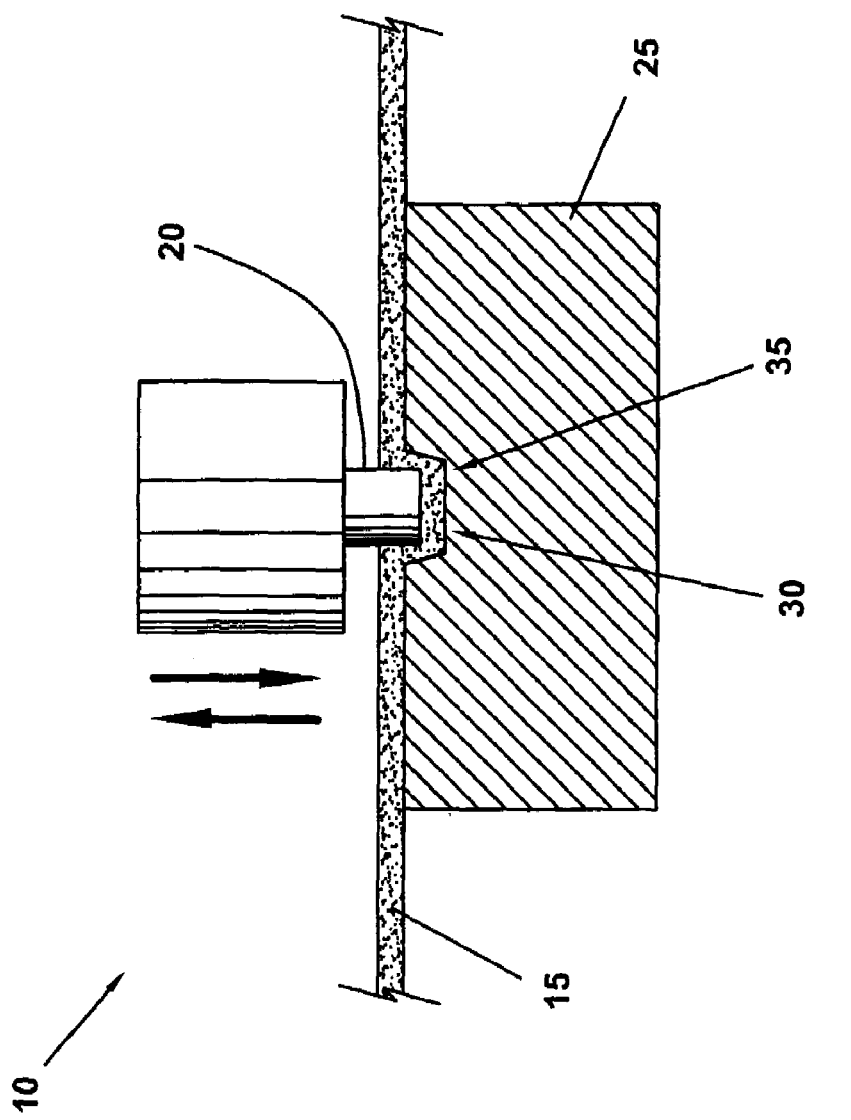
FIG. 1 (KNOWN ART)

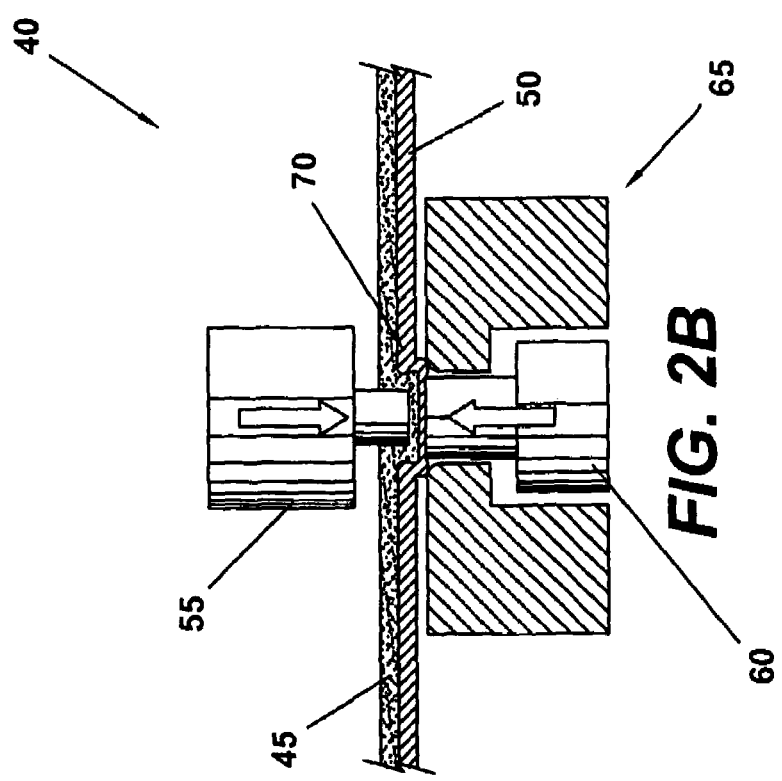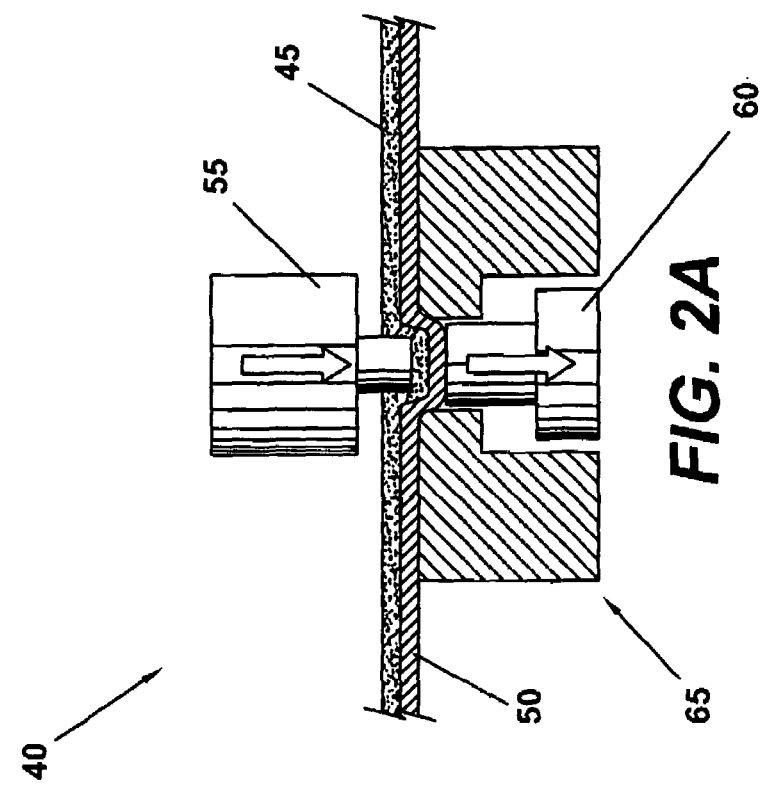

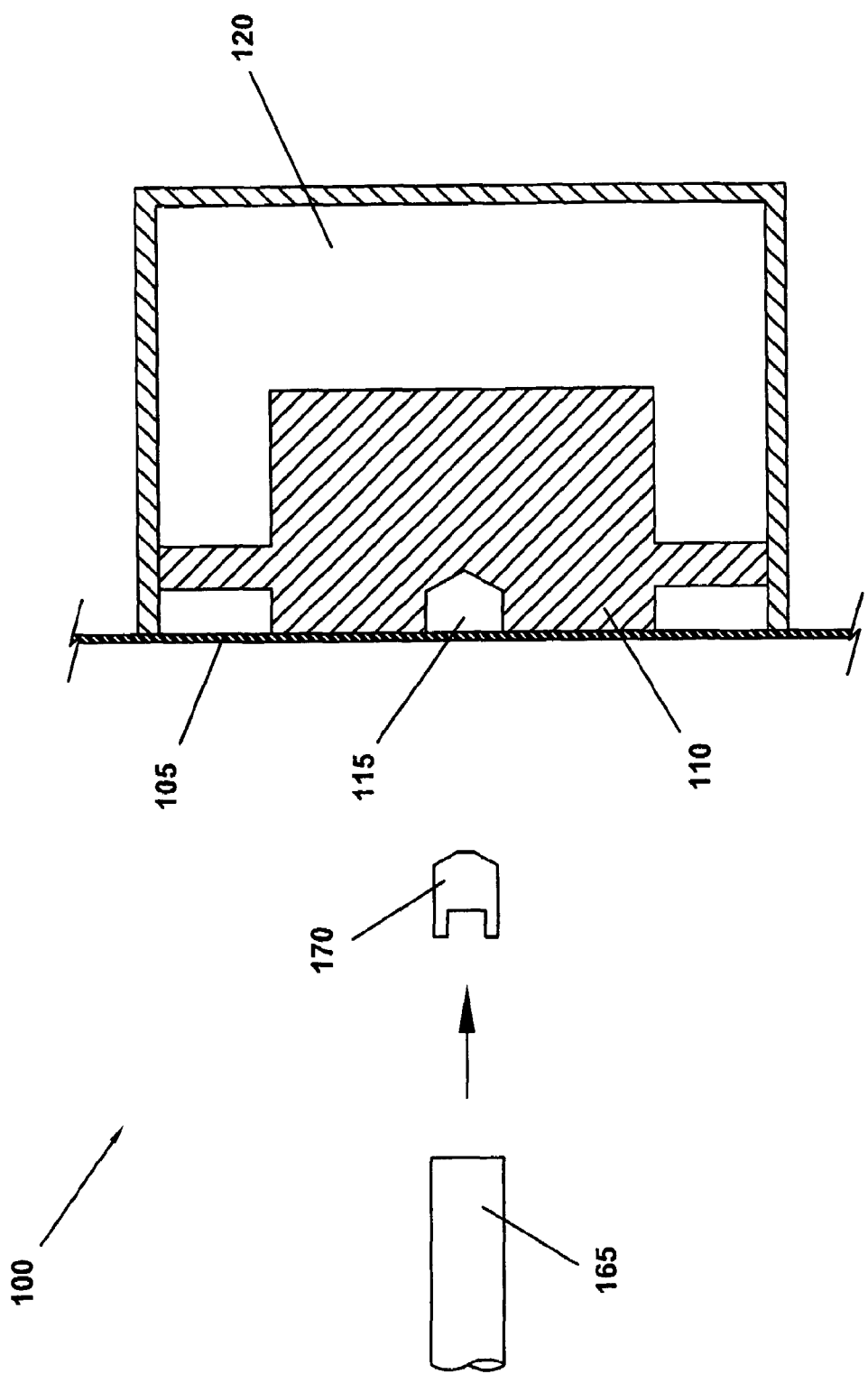

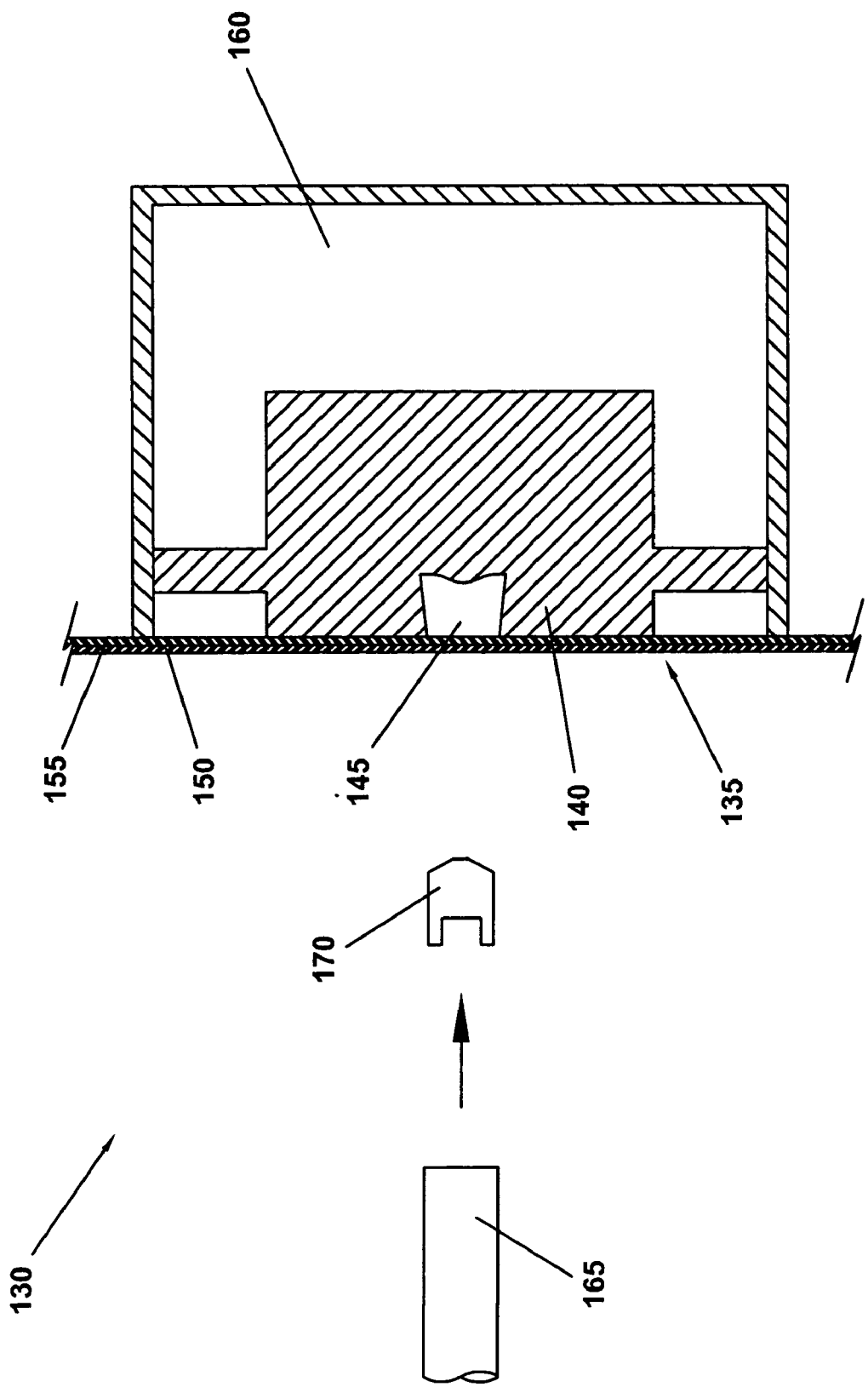

HIGH VELOCITY FORMING OF LOCAL FEATURES USING A PROJECTILE

The present application is a continuation of U.S. application Ser. No. 09/965,993, filed Sep. 28, 2001, now U.S. Pat. No. 6,807,717 the substance of which is hereby incorporated by reference herein.

BACKGROUND OF THE INVENTION

1. Field of the Invention

The present invention is directed to a system and method for the forming of local features in, and/or accomplishing the localized joining of sheet materials of various composition, by the contacting of the materials with a high-velocity projectile. The system and method The area of the sheet material to be formed is placed over a forming die having a cavity of desired shape. A preferably deformable projectile is then propelled into the area of the sheet material to be formed, such that a portion of the material is driven into the forming die. The system and method of the present invention may be used to form particular features in the sheet material, to join two or more sheets of material, or to connect a sheet of material to a secondary component. When more than one material is used, the materials may be of like composition or, alternatively, the system and method of the present invention may be employed to join dissimilar materials.

2. Background

Many products are manufactured from metallic or other sheet materials, wherein the products require the forming of particular, localized features at certain locations thereon. Similarly, there are many products whose manufacture requires the attachment of one or more secondary components to a sheet material at one or several localized sites. In a typical attachment process, a secondary component may be locally joined to a sheet material by forcing a portion of the material through an opening in the component and into a subjacent cavity, whereby the shape of a cavity into which the material is forced thereafter causes the material to expand outwardly, mechanically connecting the sheet of material and the second component. Two or more sheet materials may also be locally joined by employing the system and method of the present invention. Manufacturers of aluminum cans, and automotive and aerospace products, for example, commonly employ systems and methods for effecting localized feature forming, the attachment of secondary components, and/or the localized joining of metallic materials. Such a system and method may be used, for example, to attach a pull tab to the top of a can for containing a beverage or a foodstuff.

There are known systems for providing localized feature forming and/or the localized joining of metallic materials. The most commonly employed system is likely that of the punch and die. In a punch and die system, one or more sheets of metallic material are placed between a cavity containing die and a corresponding punch. The punch and die are typically disposed on opposing portions of a forming machine, such as a hydraulic press or similar device. The forming machine causes the punch and die to come together, whereby the punch forces a portion of the metallic material into the die cavity—producing a formed feature in the material. Similarly, two or more sheet materials may be placed over a die having a properly shaped cavity, such that when the punch forces the materials into the cavity each of the materials is caused to bulge outwardly, thereby effectively affixing each material to the other by way of an interlocking shape. Such a process of mechanically interlocking the two or more materials is commonly referred to as spot clinching. It is also possible to attach a secondary component to a sheet material by using the punch to force a portion of the material through an aperture in the secondary component, and thereafter causing the material to expand outwardly beyond the circumference of the aperture—thereby effectively locking the secondary component to the sheet material. While the punch and die method of feature forming and localized joining is likely the most common method in use, it is not without limitations and problems. This process is generally limited to high ductility materials, because the operation of the punch and die generates a high shear force and may also cause a significant thinning of the materials to which it is applied. Such a mechanical process also typically requires a large structure for supporting the materials to be formed or joined, as well as a large force generating device, such as the hydraulic press mentioned above, to drive the punch into the die. In mechanical joining processes, the materials are also limited to joining by interlocking of the shapes produced by the punch and die, as a metallurgical bond between the materials cannot be developed thereby.

Electromagnetic forming has been used to generate high-velocity movement of a sheet, which can then be used to impart a shape to both entire metal sheets, and to smaller, localized features within a metal sheet. While electromagnetic forming has proven effective for use in forming large features, it is typically less effective when utilized to form smaller, localized features. The forming of localized features often requires the application of very high and localized forces. In such cases, process efficiency suffers, and small robust actuators are quite difficult to fabricate. Consequently, because it is very difficult to focus sufficient electromagnetic energy on a small surface area, it is generally not practical to use an electromagnetic forming process in this manner.

Localized high explosives have been used for some time to join primarily dissimilar metallic components. Typically, one component is situated at a slight distance from the other component, so that an explosive charge can be used to drive the components into contact with one another. The explosive charge causes the components to collide at a sufficient velocity and angle to form a metallurgical bond therebetween. Explosive welding is commonly used to create sealed joints, such as vacuum joints, between metals such as aluminum, copper and stainless steel. Other uses for explosive welding may include the placement of a cladding onto a steel substrate, and the joining of aluminum to low-expansion metals in the electronics industry. Explosive welding is not typically used to form localized features or to join thin metallic sheets.

Ultrasonic or friction welding has also been used to join metallic and non-metallic components. Such methods involve placing the components into contact and causing movement along the joint interface located therebetween. Commonly, a friction weld is generated by rotating one component against a fixed second component under pressure. In this manner, sufficient frictional heat can be produced between the components such that at least one of the components can become plastic at the joint interface. When the rotational motion is halted, the components become physically bonded together. Friction welding also generally requires that at least one of the components be circular at the joint interface. Friction welding cannot be used to form localized features, and also cannot be used to join sheets of metallic materials in localized areas.

Hyper-pressure water jet pulses have recently been proposed to accomplish the bonding of aluminum components. In this method, a hyper-pressure pulse is developed by directing a high-pressure water jet pulse through a tapered nozzle to further increase its acceleration and pressure. Aluminum components to be joined are placed on an assembly fixture where they can be contacted with the hyper pressure water jet pulse. The hyper pressure water jet pulse can be used to cause a mechanical interlocking of the components and, if the stagnation pressure of the pulse is sufficiently high, may cause a plastic deformation of the components. This technique requires an ultrahigh-pressure pumping system to generate hyper pressure water jet pulses. This technique also requires the use of a manipulator, such as a robotic arm, to place the water jet nozzle substantially against the materials to be formed or joined.

While it can be seen from the foregoing that there are various systems and methods for providing localized feature forming and joining of materials, some of which can be used to join dissimilar materials, there remains a need for a system and method that can produce localized features that cannot effectively be produced by these known methods. For example, it is desirable to satisfactorily produce localized features that currently typically result in a tearing or excessive thinning of the material or materials involved. There also remains a need for a system and method of efficiently producing a localized joining of multiple sheets of material, wherein more than a mechanical bond is created therebetween, and/or where the joining may be accomplished at arbitrary points over a large surface area. For example, to increase the strength of the joint created between the materials, it is desirable that a metallurgical bond be created, such as by causing the materials to become plastic in the joint area. Such a method may be used to join similar or dissimilar materials.

SUMMARY OF THE INVENTION

The present invention satisfies the aforementioned needs. The present invention provides a system and method of forming localized features in sheets of metallic material, as well as a system and method of joining multiple sheets at one or more locations by forming a metallurgical bond therebetween. The system and method of the present invention also allows for the attachment of secondary components to a sheet of material. The system and method of the present invention accomplishes these actions by contacting the sheet or sheets of material with a high-velocity projectile.

When used to form localized features, a sheet of material is preferably placed over a die containing a cavity, which cavity is of substantially the same shape as the desired localized feature to be formed. A projectile firing device is preferably located at some distance from the sheet of material and is substantially aligned with the die cavity. A preferably deformable projectile is then propelled from the projectile firing device into the sheet material, whereby the kinetic energy of the projectile forces a portion of the sheet of material into the die cavity—resulting in the formation of the localized feature.

When used to join two or more thin materials, the materials are similarly placed, preferably with substantially no gap therebetween, over a die containing a cavity. As in the forming method described above, the projectile firing device is used to fire a preferably deformable projectile into the materials where they overly the die cavity. Also as in the forming method, the materials are driven into the die cavity, wherein their shape is determined thereby. Using the system and method of the present invention, the materials may become joined by two mechanisms. First, the die cavity may be designed such that the materials will become mechanically interlocked with one another, such as is achieved in a traditional spot clinching process. Secondly, a metallurgical bond may be established between the materials as a result of the kinetic energy of the high-velocity projectile being transferred thereto. Thus, a stronger and more durable joint may be produced than may be accomplished by mechanical joining alone.

The projectile is preferably of a deformable material such as lead or plastic, but it is contemplated that other projectile materials may also be used, such as, for example, water in the form of liquid or ice. The projectile may be fired into the material(s) by any conventional means, such as, for example, by compressed air, explosive charge, electrical charge, or by any number of other means that are capable of accelerating the projectile to a sufficient velocity. The material(s) may be releasably secured in a position over the die cavity by clamping devices, by vacuum holding devices, or by means of a magnetic holding system.

Because the energy of the projectile can be effectively focused in a small region, the system and method of the present invention is especially useful for forming small and/or complex features, for achieving the localized joining of multiple sheets of material, in the attachment of secondary components to a sheet of material, or for joining a sheet material to a substantially more massive component. Also, it has been found through experimentation that the system and method of the present invention increases the forming limits of metallic sheet materials. More specifically, the system and method of the present invention appears to cause a through-thickness squeezing of the metallic material into the die cavity as opposed to causing a stretching of the material, thereby allowing the metallic sheet material to be thinned to a considerably greater degree without tearing than is typically possible by known forming systems and methods. Also, high-velocity deformation appears to actually inhibit the metal tearing process. Consequently, sharper, deeper, and more complex features may be formed without causing a tearing of the material, and lower ductility materials, which are typically stronger, may also be used. It has been found that the system and method of the present invention is also effective in minimizing or eliminating other problems associated with metal forming, such as, for example, wrinkling and distortion. When used to join multiple sheets of material, the system and method of the present invention has been found to produce joints of increased strength, as the kinetic energy imparted to the materials by the high-velocity projectile is sufficient to produce an inertial welding of the materials that results in a metallurgical bond therebetween.

There are also aspects of the system and method of the present invention other than those already described above. For example, the equipment required to produce high-velocity forming or joining using a projectile is inexpensive in comparison to the equipment required to achieve similar results by the known, aforementioned techniques. No hydraulic or other press device is required as in the traditional punch and die technique, therefore there is no need for a large framework or for a complex, two-part, forming/joining die. Additionally, in the case of the system and method of the present invention wherein the materials are magnetically held in position above the die cavity, features and joints may be produced at arbitrary locations about large sheets of material, without the large clamping and support frame generally required by known techniques. Thus, the system and method of the present invention offers numerous advantages over known systems for producing localized features in sheet materials, for accomplishing the localized joining of multiple sheets of material, and for attaching secondary components to a sheet of material.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features, and wherein:

FIG. 1 is a schematic view, in partial cross-section, depicting a typical punch and die process for forming a local feature in a sheet of material;

FIG. 2 is a schematic view, in partial cross-section, illustrating a typical punch and die process for joining two sheets of material;

FIG. 3 is a schematic view, in partial cross-section, representing one embodiment of the system of the present invention used to produce local features in a sheet of material;

FIG. 4 is a schematic view, in partial cross-section, representing an embodiment of the system of the present invention used to produce a joint for locally joining multiple sheets of material;

DETAILED DESCRIPTION OF THE EXEMPLARY EMBODIMENT(S)

Figure 5B:
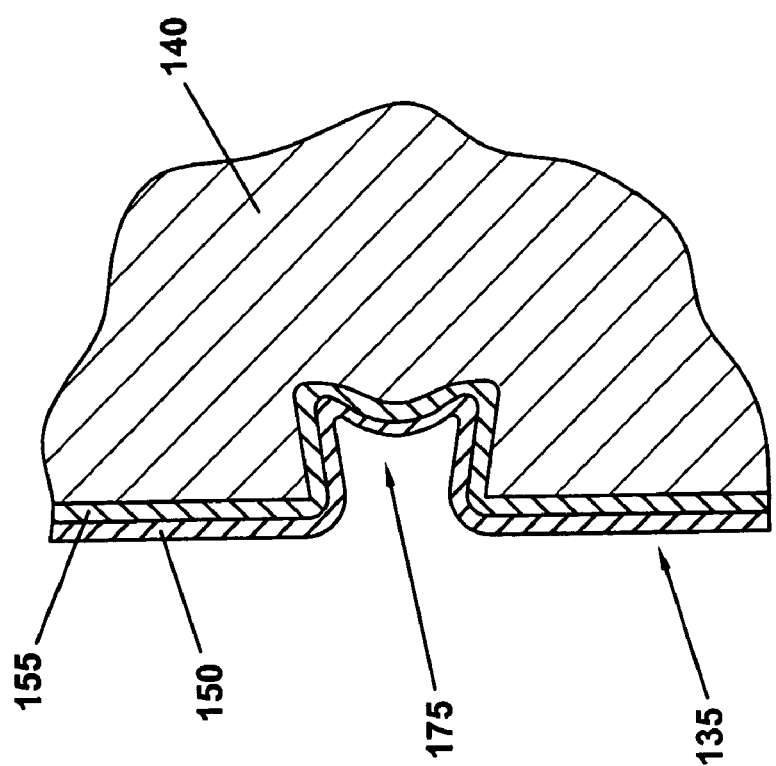
FIGS. 5A and 5B are enlarged views illustrating the local feature and joint produced by the embodiments of the system and method of the present invention shown in FIG. 3 and FIG. 4, respectively.

As described above, the system and method of the present invention uses a high-velocity projectile to form local features in sheet materials, to join multiple sheets of material, to attach secondary components to a sheet of material, or to attach a sheet of material to a substantially more massive component. The system and method of the present invention is amenable to use with various materials, such as, for example, sheet metal. The joining process of the present invention may be used on either similar or dissimilar materials. The system and method of the present invention provides certain advantages over known systems and methods for accomplishing similar results. As stated previously, the most common of these known systems is likely the punch and die system. An example of a common punch and die system 10 that can be used for feature forming may be observed by reference to FIG. 1. As can be seen, a sheet of material 15, such as a piece of sheet metal, is placed between a punch 20 and a die 25 having a cavity 30 designed to impart a particular shape to the sheet of material. As indicated by the arrows, the punch 20 is adapted to contact the sheet of material 15 and to thereafter be withdrawn therefrom. Such a punch and die system is commonly installed into a hydraulic press, whereby the die is affixed to a stationary portion and the punch is affixed to a moving portion thereof. As the punch 20 is driven into the sheet of material 15, the punch drives a portion of the sheet into the cavity 30 of the die 25. The punch 20 is typically designed to enter only a certain depth into the cavity 30. The result of forcing the sheet of material 15 into the cavity 30 is the formation of a local feature 35 on the sheet.

FIGS. 2A and 2B illustrate a typical, known punch and die system 40 that can be used for the localized joining of sheet materials, such as sheet metal. The process shown in FIGS. 2A–2B is commonly referred to as a double-stroke clinching process. As can be seen, multiple sheets of material 45, 50 are placed into contact and are located between a punch and die arrangement having an upper punch 55, a lower punch 60, and a forming die 65. In the first step of the process, shown in FIG. 2A, the upper punch 55 is forced downward into the sheets of material 45, 50, thereby driving a portion thereof into the forming die 65 and against a top surface of the lower punch 60, which is generally allowed to move downward. This step forms a male feature that protrudes from the material sheets 45, 50. In the second step, illustrated in FIG. 2B, a downward force is maintained on the upper punch 55, while the lower punch 60 is moved upward, compressing the portion of the sheets of material 45, 50 located between the punches. This action causes a further thinning in the portion of the sheets of material 45, 50 located between the punches, and also causes a portion of the male feature to bulge outward, thereby forming a clinch joint 70. The clinch joint 70 is formed by the mechanical interlocking of the sheets of material 45, 50.

Each of the systems 10, 40 and methods shown in FIGS. 1 and 2A–2B have drawbacks, however, as do the other systems and methods previously discussed. For example, the type of features that may be formed using the system 10 and method of FIG. 1 is limited because the operation of the punch 20 and die 25 creates a large shear deformation in the portion of the sheet of material 15 that is pressed into the die cavity 30. Additionally, the punch 20 stretches the material 15 into the die cavity 30, which makes the material amenable to tearing. For this reason, features formed by this system and method must be of limited shape and sharpness, and the material used must generally be of high ductility. Similarly, the spot clinching process performed by the system 40 of FIGS. 2A–2B is inferior to the joining process that can be accomplished by the system and method of the present invention, because the spot clinch 70 relies only on the mechanical interlocking of the material sheets 45, 50 for the strength of the joint. Additionally, as can be observed from FIG. 2A and 2B, such a process is complex, and requires costly equipment to perform.

In contrast to the systems of FIGS. 1 and 2A–2B, as well as those described infra, the system and method of the present invention allows for the improved forming of local features, and for the creation of joints of increased strength via a metallurgical bonding of the sheets. An exemplary embodiment of a system 100 of the present invention designed for producing local features in sheet materials can be observed from the schematic representation thereof in FIG. 3. A sheet of material 105, in this particular embodiment a section of sheet metal, is arranged over a forming die 110. The forming die 110 is preferably constructed of steel or another material with sufficient hardness to resist the impact of a high-velocity projectile 170 used to form the feature in the sheet of material 105. The forming die 110 has a die cavity 115 that lies subjacent to the sheet of material 105 when the sheet of material is in contact with the forming die. The die cavity 115 is shaped to impart a particular feature 125 into the sheet of material 105. In this particular embodiment of the present invention, the sheet of material 105 is releasably held in place along the surface of the forming die 110 by the vacuum of an evacuated chamber 120. It should also be realized, however, that the sheet of material 105 could be satisfactorily held in place by a clamping system, by magnetic attraction, or numerous other suitable means. Depending on the orientation of the forming die 110, it is also possible that the sheet of material 105 may be formed without being releasably affixed in place above the forming die. However, affixing the sheet of material 105 during forming helps to ensure that the feature 125 will be formed in the correct location thereon.

An alternate embodiment of the present invention is shown in FIG. 4. In this embodiment, the system 130 is designed to cause the localized joining of two sheets of material 135, although it should be realized that more than two sheets of material may also be joined. In similar fashion to the system 100 of FIG. 3, the sheets of material 135 are arranged over a forming die 140. As in the previous embodiment, the forming die 140 is preferably constructed of steel or another material with sufficient hardness to resist the impact of the high-velocity projectile 170 (see FIGS. 3–4 and 6) used to join the sheets of material 135. The forming die 140 has a die cavity 145 that lies subjacent to the sheets of material 130 when the sheets of material are in position over the die cavity. The die cavity 145 is preferably shaped either to produce an interlocking relationship between the two sheets of material 135 during the joining process, to cause the sheets of material to deform in a manner that promotes metallurgical bonding therebetween, or both. For example, the die cavity 145 may cause a portion of the sheets of material 135 to bulge outward, or may produce some other shape, such as a reentrant shape, that substantially prevents the extraction of the top sheet of material 150 from the bottom sheet of material 155 at the localized joint 175 (see FIG. 5) formed by the joining process. The reentrant shape described herein and shown in the drawing figures is merely exemplary, however, and it should be realized that It is also possible to produce an interlocking joint between the sheets of material without requiring a reentrant shaped die cavity. The sheets of material 135 may be held in place during the joining process as described above or, alternatively, may be joined without being held in place. In this particular embodiment of the present invention, the sheets of material 135 are releasably held in place along the surface of the forming die 140 by the vacuum of an evacuated chamber 160. It should also be realized, however, that the sheets of material 135 could also be held in place by a clamping system, by magnetic attraction, or numerous other suitable means.

Figure 5A:
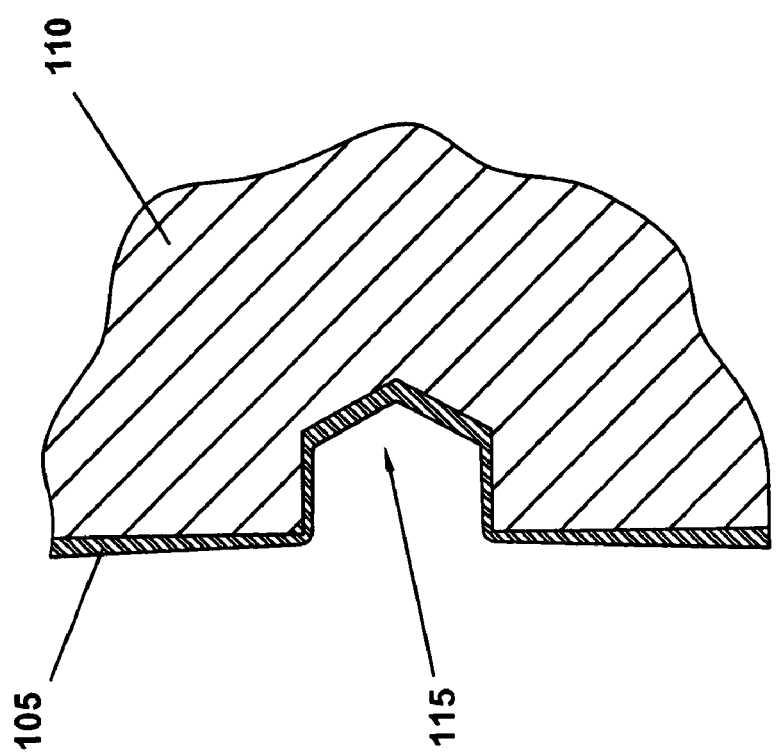

Typical results of using the system and method of the present invention can be observed in more detail in FIGS. 5A–5B. FIG. 5A shows an enlarged view of the die cavity 115 and surrounding portion of the die 110 of FIG. 3, after the sheet of material 105 has been forced into the die cavity by the projectile 170. As can be seen, a portion of the sheet of material 105 has been squeezed into the die cavity 115 and against the walls thereof, such that the shape of the die cavity is imparted to the sheet of material. It can also be observed in FIG. 5A that the system and method of the present invention allows for a substantial thinning of the sheet of material 105 as it is forced into the die cavity 115—without causing the material to tear. Similarly, FIG. 5B illustrates an enlarged view of the die cavity 145 and surrounding portion of the die 140 of FIG. 4, after the sheets of material 150, 155 have been forced into the die cavity 145 by the projectile 170. As can be seen, the projectile 170 forces a portion of each of the sheets of material 150, 155 into the die cavity 145 to form an interlocking joint 175. Although the joint 175 is shown to be of a reentrant shape in this particular example, interlocking joints of various shape may be formed. As in the feature of FIG. 5A, a thinning of the sheets of material 150, 155 may occur as a portion thereof is forced into the die cavity 145. A metallurgical bonding can be produced at points along the interface formed between the sheets of material 150, 155 due to the transfer of kinetic energy from the projectile 170 thereto.

Figure 6:
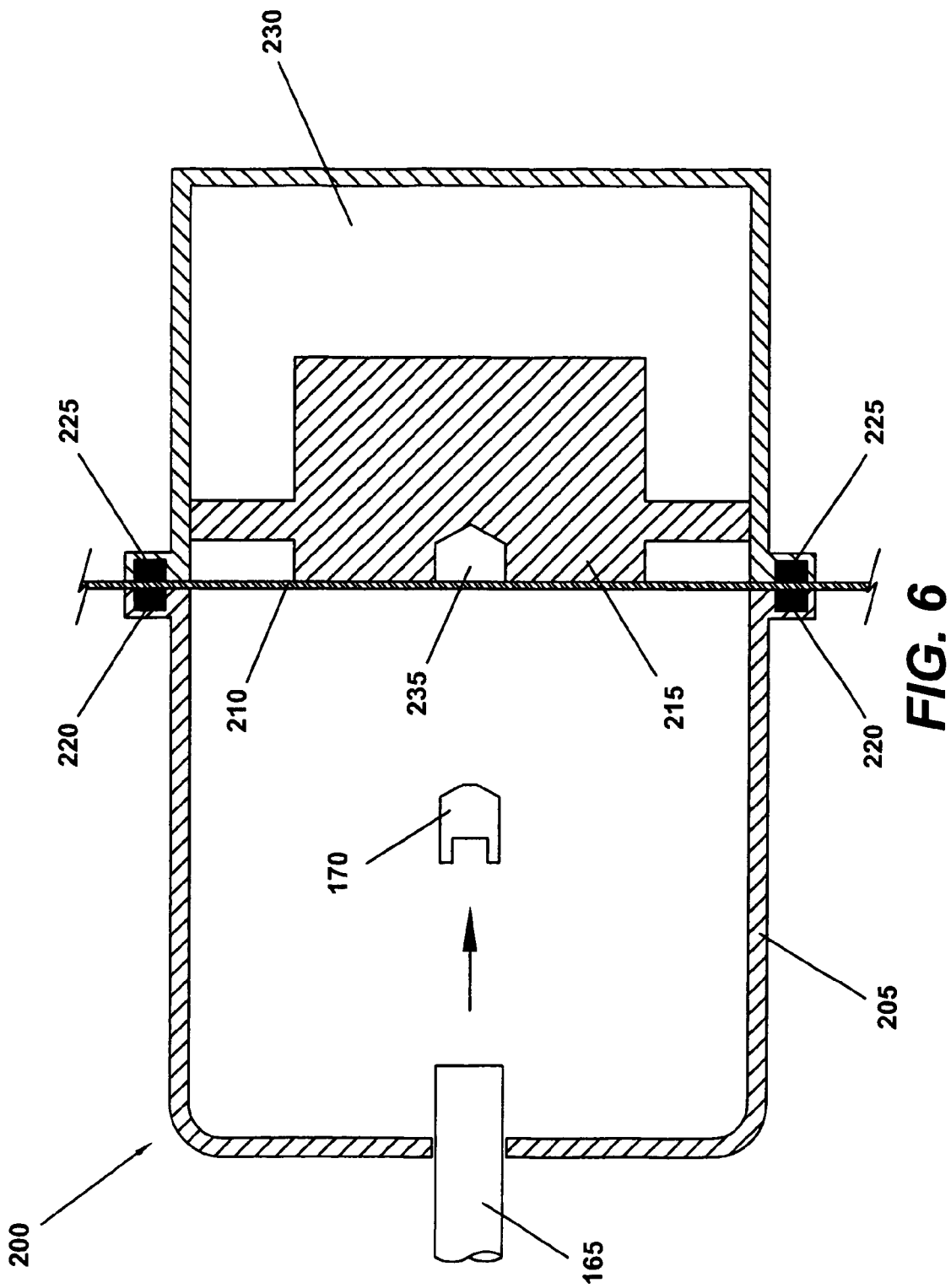
FIG. 6 is a schematic view, in partial cross-section, representing an alternate embodiment of the system of FIG. 3, wherein a protective housing is utilized.

Another embodiment of the system of the present invention can be seen in FIG. 6. In this particular embodiment, the system 200 is provided with a protective enclosure 205 that preferably encapsulates a portion of a projectile firing device 165 and the area between the projectile firing device and the portion of the sheet of material 210 that will be contacted with the projectile 170. The protective enclosure 205 preferably helps to ensure that contact with the moving projectile 170 after its firing from the projectile firing device 165 is difficult, if not impossible. The protective enclosure 205 also preferably contains any projectiles that may ricochet after contact with the sheet of material 210. A magnetic holding system, in this embodiment consisting of pairs of magnets 220, 225, is located in the protective enclosure 205 and a portion of a structure 230 to which the die 215 is mounted, respectively. The sheet of material 210 may be moved between a gap situated between the magnets 220, 225 and into the area of the die 215 to reside over the die cavity 235. It should also be understood that such a protective enclosure 205 could be used in conjunction with the evacuated chamber 120 system of FIG. 3, or other sheet holding systems. Thus, in addition to increasing the safety of the system and method of the present invention, the protective enclosure 205 further provides an effective and inexpensive method of accomplishing the securing of the sheet of material 210 and the proper alignment of the projectile firing device 165 with the die cavity 235.

In each of the embodiments illustrated in FIGS. 3–4 and 6, the projectile firing device 165 can be observed to be substantially aligned with the die cavity 115, 145. The alignment may be accomplished by a number of means, including optical alignment, laser alignment, mechanical alignment, such as by the magnetic system shown in FIG. 6, or by other similar methods. The projectile firing device 165 is provided to propel a projectile 170 into the sheet 105, 210 or sheets 135 of material covering the die cavity 115, 145, 235. The projectile firing device 165 is preferably adapted to propel the projectile 170 to a predetermined velocity calculated to accomplish the particular task. The projectile firing device 165 may propel the projectile 170 by a multitude of means. For example, an explosive charge, such as is commonly employed in typical firearm ammunition, may be used to fire the projectile 170 from the projectile firing device 165. Other means of propulsion may also be employed, including, for example, compressed air or another gas, a contained chemical reaction, or an electrical discharge. These examples are given for purposes of illustration only, however, and should not be interpreted to limit the design of the projectile firing device 165 thereto. It should also be realized that there may be other means developed in the future that may be satisfactorily used to propel the projectile 170, and these means are considered to be within the scope of the present invention.

In the case of forming a feature in a sheet of material, the velocity of the projectile 170 should be such that the projectile is able to press the sheet of material sufficiently into the cavity of the die. In the case of locally joining two or more sheets of material, the velocity of the projectile should be sufficient to cause the inertial welding of the sheets at the joint. Thus, the velocity of the projectile must have a sufficient kinetic energy to cause a plastic deformation of the material as it is forced into the die cavity, thereby creating a metallurgical bond between the materials. It has been found that a projectile velocity of between about 50 and 2,000 ft/sec is sufficient to accomplish either feature forming or localized joining. The proper velocity is, of course, dependent on, among other factors: the task to be performed; the type of material that will be contacted by the projectile; the thickness of the material in the area of impact; the specific geometry of the feature to be formed or the joint to be created; the composition of the projectile; the shape of the projectile; and the mass of the projectile.

The shape of the projectile 170, as depicted in FIGS. 3–4 and 6 is shown to be substantially similar to the size and shape of the die cavity 115, 145, 235. Providing a projectile of such a size and shape allows substantially the entire mass of the projectile to force the sheet of material into the die cavity. Accordingly, the size, shape and mass of the projectile may vary significantly depending on the size and shape of the feature to be formed in the sheet of material, as well as the composition of the sheet of material. The composition of the projectile may also vary. Preferably, the projectile is comprised of a deformable material, such that the projectile can substantially conform to the shape of the die cavity as it forces the sheet of material therein. For purposes of illustration, and not limitation, the projectile may be composed of a metallic material, such as lead, of a deformable plastic such as polyethylene, or of a liquid, such as water. Water in the form of ice may also be used as a projectile. As projectiles are fired into the sheet or sheets of material, the projectiles will typically become deformed. Preferably, a means is provided to collect the deformed projectiles. Depending on the operation performed by the projectile, the composition thereof, and the projectile firing device used, the projectile may be reused as recovered, may be recycled and reused, or may be discarded. In the case of a liquid projectile, in the form of ice or water, the projectile need merely be drained away from the die, or allowed to melt and drain away.

Figure 7:
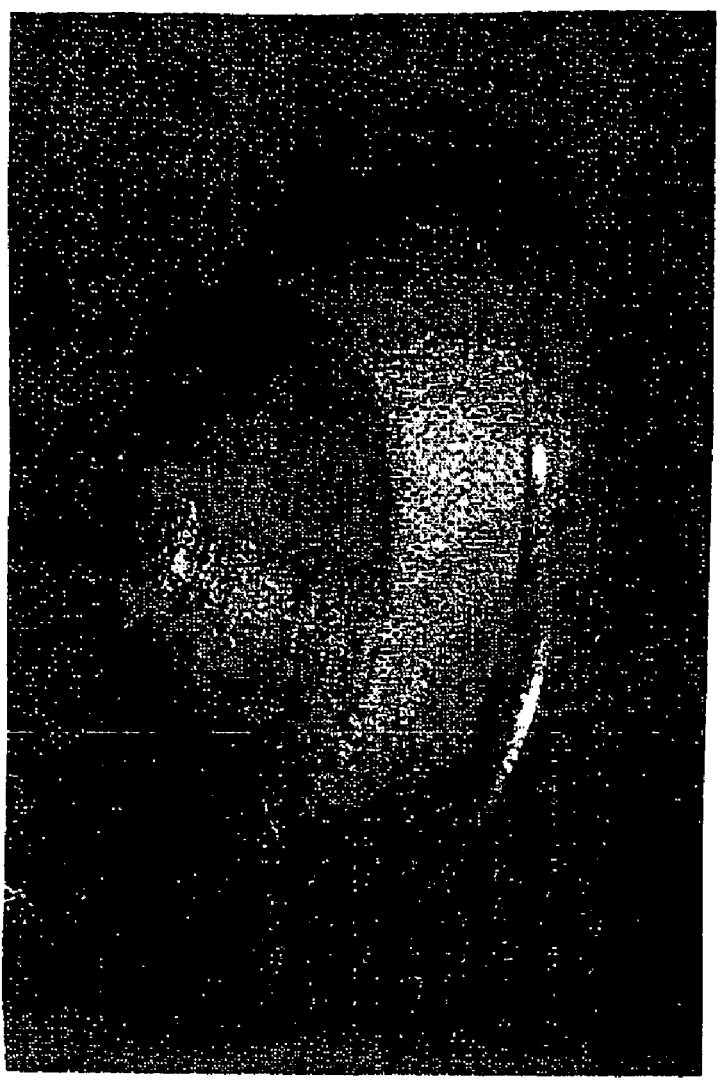
FIG. 7 is an enlarged isometric view of a feature formed in a steel sheet by impacting the steel sheet with a high-velocity projectile according to the system and method of the present invention.
Figure 8:
FIG. 8 is an enlarged cross-sectional view of the feature of FIG. 7.

An example of a feature formed in a low-ductility steel sheet by the system and method of the present invention can be seen in FIGS. 7–8. It has been found that the system and method of the present invention is able to increase the forming limits of metal sheets, and can also effectively treat certain other metal forming problems, such as, for example, wrinkling and distortion. This appears to be primarily due to the high velocity of the projectile used to form the feature in the metal sheet being able to suppress fracturing of the metal during formation of the feature. The fracturing is suppressed largely because the projectile causes a through-thickness squeezing of the metal into the cavity, rather than a stretching of the metal as is produced by the traditional punch and die method. As such, the metal forced into the cavity may experience more thinning without tearing than is typically possible using known systems and methods. As a result of this phenomenon, lower ductility materials may be formed into features having geometries not traditionally possible.

The feature of FIGS. 7–8 is exemplary of this aspect of the present invention. The feature of FIGS. 7–8 was formed in a low-ductility steel which normally allows for less than a 5% elongation before failure, such as tearing. However, as can be best observed by reference to FIG. 8, employing the system and method of the present invention permits the feature illustrated therein to be produced with a material thinning in excess of 30%—without failure.

Figure 9:
FIG. 9 is an enlarged cross-sectional view of a joint formed between two sheets of metallic material by the system and method of the present invention.

An example of the localized joining of multiple sheets that may be accomplished by the system and method of the present invention is illustrated by the joint of FIG. 9. The joint of FIG. 9 was formed, substantially as depicted in FIG. 4, by placing the two metallic sheets over a cavity in a forming die, and firing a projectile into the metal sheets. The projectile squeezes the sheet metal into the die cavity, where the sheet metal is formed thereby. Preferably, the die cavity is shaped to form an interlocking joint between the metal sheets, such that the sheets cannot be readily separated after the joint is formed. While such an interlocking joint may be sufficient to secure the sheets together, the present invention also allows for a further bonding between the sheets to be achieved. In the joint of FIG. 9, for example, the velocity and resulting kinetic energy of the projectile was sufficient to cause an inertial welding between the metal sheets. More specifically, the inertial welding was accomplished by the transfer of kinetic energy from the projectile to the sheet metal during impact. As the sheet metal was forced into the die cavity by this kinetic energy, certain portions of the metal were transformed into a plastic state by the pressure on the metals and the sliding friction that occurred between the two sheets. As the transfer of kinetic energy occurs extremely quickly during this process, the plastic deformation and subsequent cooling also occurs very quickly. Due to the frictional work breaking up surface oxides and allowing intimate contact, a metallurgical bond is established between the sheets that creates or further strengthens the formed joint.

Figure 10:
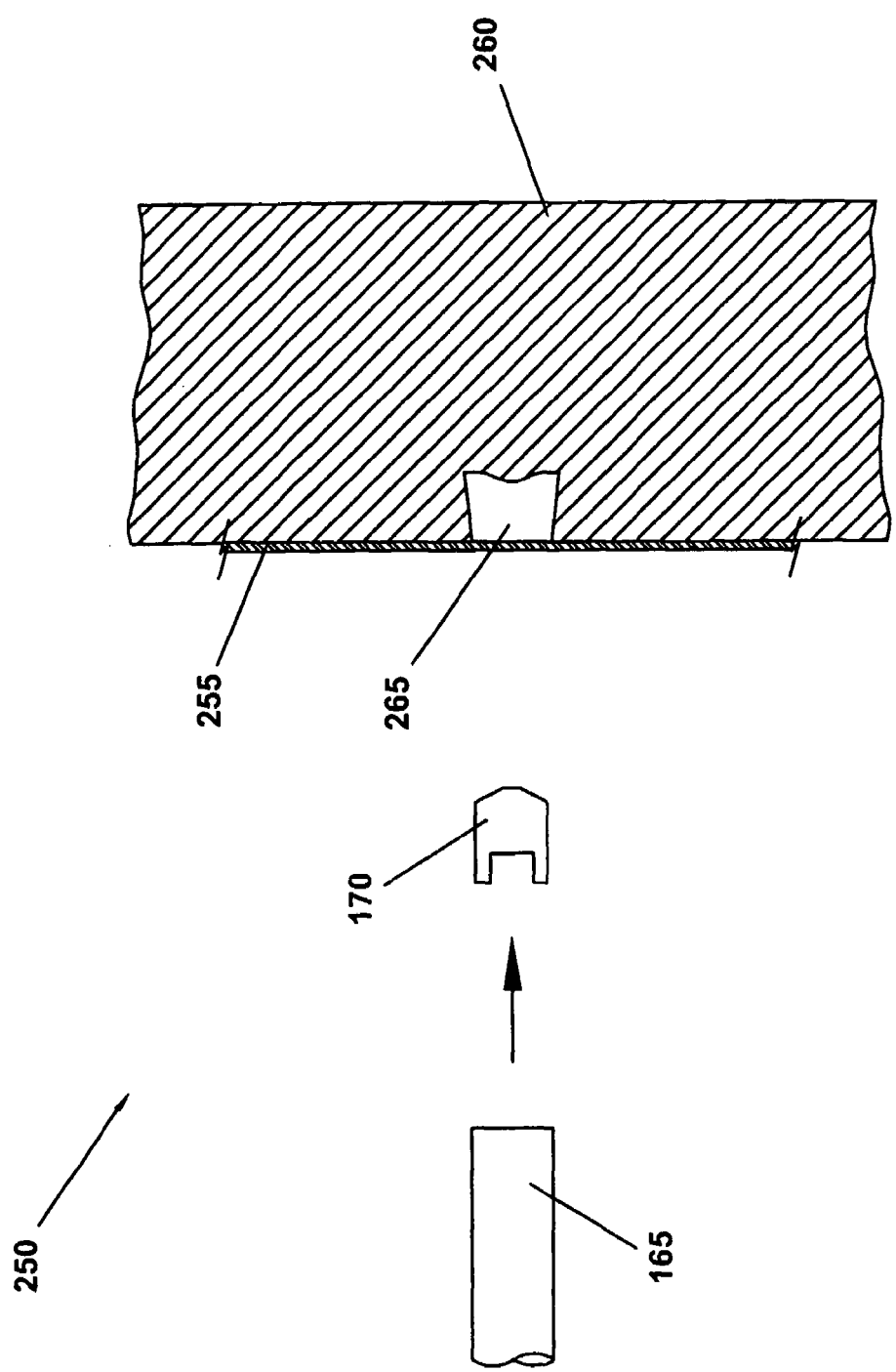
FIG. 10 shows an alternate embodiment of the present invention, wherein one or more thin sheets of material may be joined to a substantially more massive component.

As illustrated in FIG. 10, the system and method of the present invention can also be employed to join a relatively thin sheet(s) of material 255 to a substantially more massive component 260. In this embodiment 250 of the present invention, a die may not be necessary. As can be seen, a receiving shape 265 may be cut or otherwise formed in the more massive component 260 at the desired joining location. The sheet(s) of material 255 may then be placed in position over the more massive component 260 and preferably secured in place by any of the securing means previously described. If the more massive component 260 is of sufficient mass, a projectile 170 may then be fired from a projectile firing device 165 into the sheet(s) of material 255, with the more massive component itself resisting the force of the projectile. The impact of the projectile 170 forces a portion of the sheet(s) of material 255 into the receiving shape 265. As shown in the drawing figures and described infra, the receiving shape 265, like the die cavity 145, 235, may be designed to produce a mechanical interlocking between the more massive component 260 and the sheet(s) of material 255. Although the receiving shape 265 in this particular embodiment is shown to have a reentrant shape, it should be realized that such a shape is not essential to producing an interlocking joint. The receiving shape 265 may also be designed to encourage the formation of a metallurgical bond between the more massive component 260 and the sheet(s) of material 255. Thus, joining of the more massive component 260 and the sheet(s) of material 255 may be accomplished by either of these techniques, or by a combination of both.

While not specifically shown in the drawing figures, it is also possible to use the system and method of the present invention to join or attach secondary components to a sheet of material, as well as, or rather than to accomplish the joining of two sheets. For example, a component adapted to be joined to a sheet of material may be placed into a die cavity, which cavity may be similar to those depicted in the drawing figures. The component preferably has an aperture or other structure for receiving a portion of the sheet of material that has been located over the die cavity. The projectile may then be fired into the sheet of material to force a portion thereof through the aperture in the component. The die is preferably designed to cause the material being forced through the aperture to bulge outward as it passes therethrough. The material is then forced to expand to a point beyond the circumference of the aperture, thereby causing the component to become attached to the sheet of material. Such a method may be used, for example, to install a tab to the top of a beverage can.

It can be realized from the foregoing, that the system and method of the present invention allows for a novel forming and joining of thin or sheet materials. While certain embodiments of the system and method of the present invention have been described above and in the accompanying drawing figures, it should be realized that modifications may be made thereto. For example, there can be a multitude of projectile shapes and compositions used. Numerous different materials may be formed or joined, as well multiple layers of material, and materials of various thickness. It should also be realized that the present invention is not limited to use with metallic materials, as any material having suitable ductility may be formed or joined. The projectile may also be fired into the sheet material by numerous means, as recited infra. Therefore, the scope of the invention is not to be considered limited by the foregoing disclosure, and modifications are possible without departing from the spirit of the invention as evidenced by the following claims:

What is claimed is:

1. A system for accomplishing the localized joining of multiple metallic sheets, comprising:
    a die having a cavity for creating an interlocking joint in said metallic sheets, said die adapted to reside near said metallic sheets such that said cavity lies subjacent thereto;
    a projectile firing device in substantial alignment with said cavity, said projectile firing device for propelling a deformable projectile at a high velocity into said metallic sheets; and
    a deformable projectile adapted to be propelled from said projectile firing device into said metallic sheets at a point that is in substantial alignment with said subjacent cavity, said deformable projectile for forcing at least a portion of said metallic sheets into said cavity to form said interlocking joint therein, wherein said deformable projectile is not in physical contact with said projectile firing device as said deformable projectile forces at least a portion of said metallic sheets into said cavity.

2. The system of claim 1, wherein said deformable projectile is comprised of a metallic material.

3. The system of claim 1, wherein said deformable projectile is comprised of plastic.

4. The system of claim 1, wherein said deformable projectile is comprised of a liquid.

5. The system of claim 1, wherein said deformable projectile is comprised of ice.

6. The system of claim 1, further comprising a means for securing the position of said metallic sheets during the impact of said deformable projectile.

7. The system of claim 6, wherein said securing means is a vacuum.

8. The system of claim 6, wherein said securing means is magnetic.

9. The system of claim 6, wherein said securing means is mechanical.

10. The system of claim 1, wherein said projectile firing device propels said deformable projectile at a velocity sufficient to cause a metallurgical bond between a portion of the metallic sheets in said joint.

11. The system of claim 1, wherein said joint has a reentrant shape.

12. A system for accomplishing the localized joining of multiple metallic sheets, comprising:
    a die having a cavity for imparting a shaped feature to said metallic sheets, said die adapted to reside near said metallic sheets such that said cavity lies subjacent thereto;
    a deformable projectile adapted to be propelled from a projectile firing device into said metallic sheets at a point that is in substantial alignment with said subjacent cavity, said deformable projectile for forcing at least a portion of said metallic sheets into said cavity to impart said shape thereto; and
    a projectile firing device in substantial alignment with said cavity, said projectile firing device adapted to propel said deformable projectile into said metallic sheets at a velocity sufficient to cause the plastic deformation and subsequent metallurgical bonding of a portion of said metallic sheets located in said joint, wherein said deformable projectile is not in physical contact with said projectile firing device as said deformable projectile forces at least a portion of said metallic sheets into said cavity.

13. The system of claim 12, wherein said deformable projectile is comprised of a metallic material.

14. The system of claim 12, wherein said deformable projectile is comprised of plastic.

15. The system of claim 12, wherein said deformable projectile is comprised of a liquid.

16. The system of claim 12, wherein said deformable projectile is comprised of ice.

17. The system of claim 12, further comprising a means for securing the position of said metallic sheets during the impact of said deformable projectile.

18. The system of claim 17, wherein said securing means is a vacuum.

19. The system of claim 17, wherein said securing means is magnetic.

20. The system of claim 17, wherein said securing means is mechanical.

* * * * *